A. M. KLOCZEWSKI & V. KLOBASSA.
Flask for Cooling Liquids.

No. 200,065. Patented Feb. 5, 1878.

UNITED STATES PATENT OFFICE.

ADRIAN M. KLOCZEWSKI AND VICTOR KLOBASSA, OF WASHINGTON, D. C.

IMPROVEMENT IN FLASKS FOR COOLING LIQUIDS.

Specification forming part of Letters Patent No. 200,065, dated February 5, 1878; application filed January 11, 1878.

*To all whom it may concern:*

Be it known that we, ADRIAN M. KLOCZEWSKI and VICTOR KLOBASSA, of Washington city, in the county of Washington, and in the District of Columbia, have invented certain new and useful Improvements in Cooling Apparatus for Liquids; and we do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of our invention consists in the construction and arrangement of a vessel or flask for cooling liquids which can be conveniently carried in the pocket, thus affording means of cooling water and other liquids to persons to whom carrying of ice would be either inconvenient or impossible — for instance, to travelers and scientific explorers.

Further, the nature of our invention consists in utilizing in our apparatus as a cooling medium chemical compounds, as certain salts, as chloride of ammonia, nitrate of potassa, &c., possessing the property of absorbing caloric when dissolved in water.

The annexed drawings represent the vertical section of our cooling apparatus.

A represents a vessel of any suitable form or shape, made of either metal, glass, leather, or any other material.

E represents a casing inclosing the vessel A, made of any suitable material, and covered with asphalt, varnish, asbestus, paint, or a close-fitting cover of textile fabric—a bad conductor of heat. The distance between the walls of the inclosed vessel A and the walls of the inclosing-vessel E is not less than a quarter of an inch, so that the said walls form the compartment B, in which the frigorific mixture can circulate freely around the walls of the vessel A.

Figure 1:
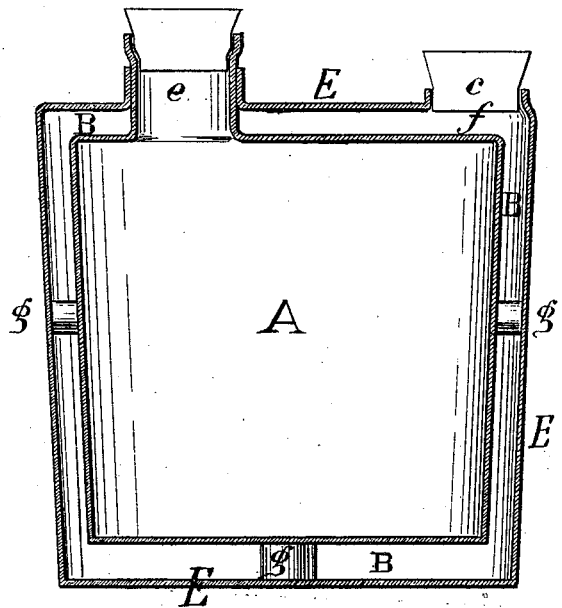
Figure 2:
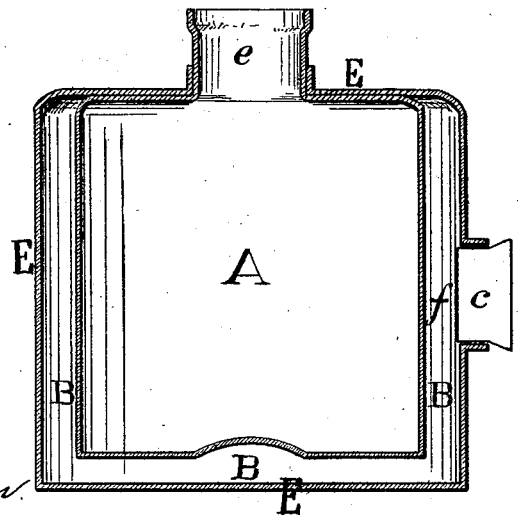

The casing can be made of metal, glass, wood, or any other suitable material. To prevent the liquid contained in the space between the walls of the two vessels A and E from escaping, the sides of the vessel E are water-tight, joined either to the neck or outlet of the vessel A, as shown in Fig. 1, or to the tops of the interior vessel A, as shown in Fig. 2. $e$ is the opening or outlet for the interior vessel A.

The exterior vessel E is provided on one of its walls with the opening or outlet $f$, which can be tightly closed with the stopper or cork $c$. $g$ are small blocks, which support the vessel in position. The blocks or supporters $g$ can be dispensed with if the sides of the vessel E are riveted or cemented to the top or to the neck or outlet of the vessel A. (Shown in Fig. 2.)

Having described the construction of our cooling apparatus, we will now proceed with the description of its operation.

A certain quantity (from one to five ounces or more, according to the size of the apparatus) of salts having the property of reducing the temperature when dissolved in water is put through the opening $f$ in the space or compartment B formed by the walls of the two vessels A and E. The liquid destined to be cooled is poured through the opening $e$ into the vessel A, and the said opening is closed tight with a stopper. Then the space between the two vessels A and E is filled with water through the opening $f$, which opening now is shut with the stopper $c$. The entire apparatus, now shut water-tight, has to be shaken, so as to produce in the compartment B a quick dissolution of salts, and obtain in this way a sudden absorption of the caloric. The low temperature produced in this way in the space or compartment B cools the liquid contained in the vessel A.

Our cooling apparatus would be of special use to travelers, excursionists, scientific explorers—in general, to persons to whom carrying ice would be either inconvenient or impossible.

The entire cooling apparatus, as well as the chemicals used with it, can be conveniently carried in the pocket. The salts can be kept either in a separate box or in a box forming the cover for the cooling apparatus.

Having thus fully described the construction of our invention and its operation, what we claim as new, and desire to secure by Letters Patent, is—

As a new article of manufacture, a refrigerating pocket-flask consisting of an interior receptacle for the liquid to be cooled and an exterior air-tight case for containing a solution of a refrigerant salt, the exterior case having an opening capable of tight closure for the introduction of the salt, substantially as described.

In testimony that we claim the foregoing as our own we affix our signatures in presence of two witnesses.

ADRIAN M. KLOCZEWSKI.
  VICTOR KLOBASSA.

Witnesses:
 GEORGE TAMMEN,
 C. ROELL.